(12) United States Patent
Pinson (10) Patent No.: US 9,210,028 B1
(45) Date of Patent: Dec. 8, 2015

(54) LOCATION-BASED DATA STREAM COMPOSITION

(71) Applicant: ARRIS Group, Inc., Suwanee, GA (US)

(72) Inventor: George Scott Pinson, Portland, OR (US)

(73) Assignee: ARRIS Enterprises, Inc., Suwanee, GA (US)

( * ) Notice: Subject to any disclaimer, the term of this patent is extended or adjusted under 35 U.S.C. 154(b) by 224 days.

(21) Appl. No.: 13/788,508

(22) Filed: Mar. 7, 2013

(51) Int. Cl.
*G06F 15/16* (2006.01)
*H04L 29/06* (2006.01)
*H04L 29/08* (2006.01)

(52) U.S. Cl.
CPC .......... *H04L 29/06027* (2013.01); *H04L 67/18* (2013.01); *H04L 63/0492* (2013.01)

(58) Field of Classification Search
CPC ............................ H04L 67/18; H04L 63/0492
USPC .................................................. 709/225, 226
See application file for complete search history.

(56) References Cited

U.S. PATENT DOCUMENTS

2003/0110130 A1* 6/2003 Pelletier .......................... 705/50

* cited by examiner

*Primary Examiner* — Adnan Mirza
(74) *Attorney, Agent, or Firm* — Bart A. Perkins (57) ABSTRACT

Methods, systems, and computer readable media can be operable to aggregate requested multimedia content and location-based content. Aggregating requested multimedia content and location-based content can be facilitated by determining the location of a client device based on information received from the client device, retrieving location-based content segments and aggregating location-based content segments with user-requested content segments.

20 Claims, 4 Drawing Sheets

LOCATION-BASED DATA STREAM COMPOSITION

TECHNICAL FIELD

This disclosure relates to aggregating location-based content with streaming multimedia content.

BACKGROUND

Digital video technology has enabled multiple distribution mechanisms for video programming content. While over-the-air (OTA) broadcast and community antenna television (CATV) remain the predominant forms of distribution for digital video, the mechanisms for distribution have changed drastically from the days of analog radio frequency transmission. In particular, digital video formats and increasing prevalence of broadband network access has facilitated the transmission of digital video using internet protocol, also known as IPTV.

Multiple service operators (MSOs) have typically adjusted to the introduction of IPTV by loading the formerly broadcast content into unicast or multicast IP packets for transmission to users, thus delivering streams similarly to those provided by internet sources, while avoiding the contention media (e.g., data services) that video transmitted over the public internet presents. With a growing variety of entertainment and multimedia content sources, advertisers are provided a growing number of outlets through which to reach potential customers. However, a need exists to provide advertisers with the efficient use of the various media outlets by targeting specific audiences.

BRIEF DESCRIPTION OF THE DRAWINGS

Like reference numbers and designations in the various drawings indicate like elements.

DETAILED DESCRIPTION

In some implementations of this disclosure, systems and methods can operate to aggregate requested multimedia content and location-based content. Advertising can be incorporated into the presentation of a video or data stream (e.g., IPTV) by adding advertisement segment references retrieved from an advertisement server. Generally, advertisers target specific audiences and many advertisers define their audience of interest based on geographic location or proximity. The defined audience of interest can be based on immediate physical location or anticipated physical location. Typically, advertisers that operate in a constrained space (e.g., duty-free shops, airport restaurants, souvenir shops, tourist attractions, museum galleries, shopping malls, etc.) target their audience based on immediate or anticipated physical location within the constrained space. For these advertisers that operate in a constrained space, advertising to audiences outside of the proximity of the constrained space provides little or no value, thus making conventional radio, television and cable advertising inefficient for these advertisers.

Advertising inefficiencies experienced by advertisers can be reduced through the implementation of a system that is operable to associate multimedia content with geographic or physical locations, discover or predict/forecast the physical location from which the multimedia content was requested, and deliver multimedia content that is relevant to the physical location from which the content was requested. Generally, when a user requests multimedia content (e.g., a program for viewing via an IPTV stream), the content is generated and is composed of a plurality of multimedia segments. In some implementations of this disclosure, the plurality of multimedia segments can include segments that represent the user-requested program as well as segments that represent advertising selected based on the physical location of the user requesting the program. In other implementations of this disclosure, where a benefit exists in receiving multimedia content that is related to the physical location of a viewer (e.g., multimedia content related to an attraction or site in a national park or museum, multimedia content used in a virtual tour guide, etc.), a user-requested program can be a broad request for multimedia content associated with the user's immediate or anticipated physical location.

Figure 1:
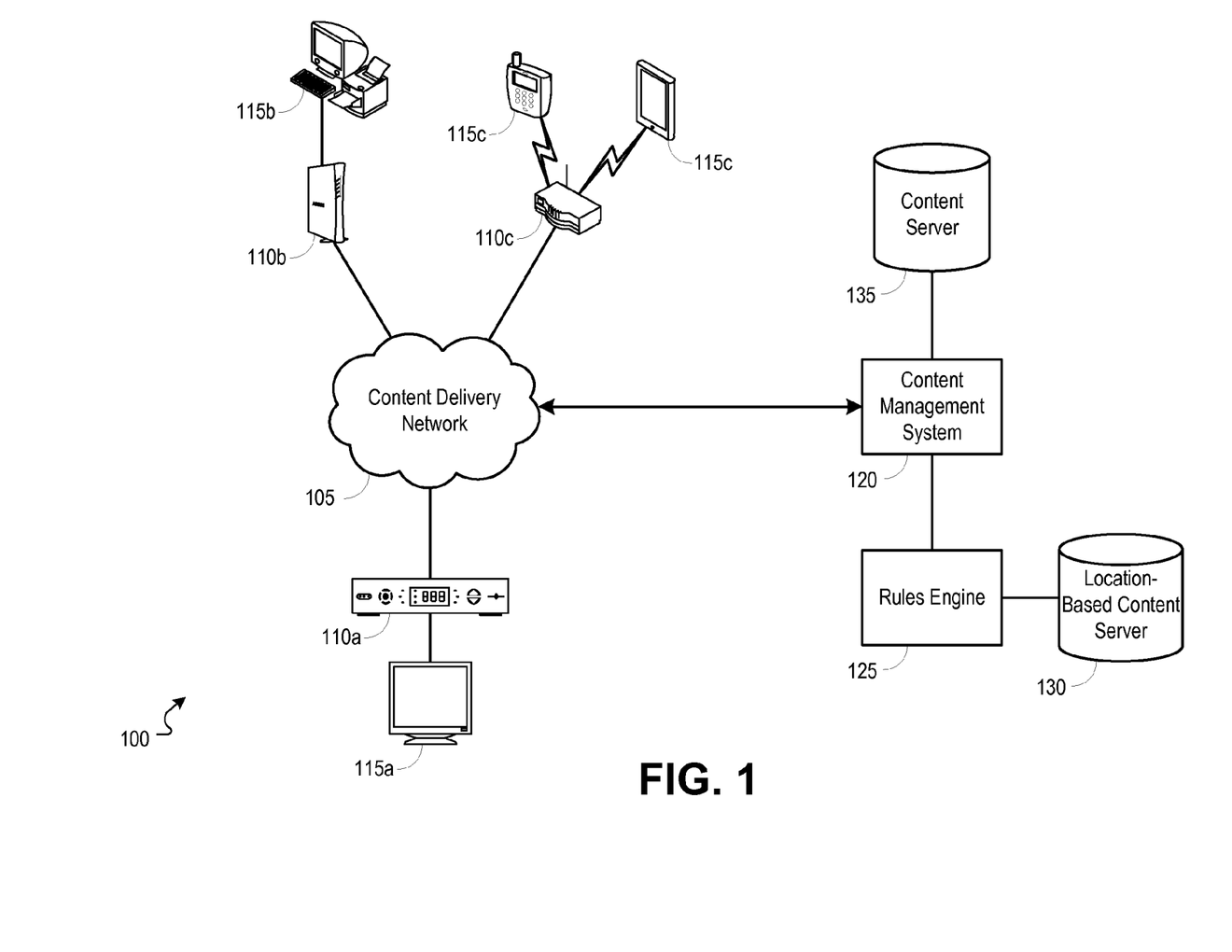
FIG. 1 is a block diagram illustrating an example network environment operable to aggregate requested multimedia content and location-based content.

FIG. 1 is a block diagram illustrating an example network environment 100 operable to aggregate requested multimedia content and location-based content. In some implementations, a content delivery network 105 (CDN) can provide video and/or data service(s) to customer premise equipment (CPE) devices 110a-c in one or more subscriber groups (e.g., service group(s)). The CPE devices can include, for example, a set top box 110a, a cable modem 110b, or a wireless router including an embedded cable modem 110c, among many others (e.g., digital subscriber line (DSL) modem, whole home gateway/digital video recorder device, communications device, cellular network base station, etc.). A set top box 110a can facilitate communications between a CDN 105 and a display device (e.g., television 115a) or a separate digital video recorder (DVR). A cable modem (CM) or embedded multimedia terminal adapter (eMTA) 110b can facilitate communications between a CDN 105 and a computer 115b. A wireless router 110c can facilitate wireless communications between a CDN 105 and a plurality of devices (e.g., mobile devices or tablets 115c, computers, etc.). It should be understood that the CDN 105 can include, for example, a hybrid fiber-coax (HFC) network, or other types of broadband access network (e.g., digital subscriber line (DSL), IEEE 802.11, cellular, etc.). Further, it should be understood that some peripheral devices 115a-c (e.g., mobile devices or tablets 115c, computers 115b, televisions 115a, etc.) can be connected directly to the CDN 105. In various implementations, a cell tower can facilitate communications between a headend and a mobile device.

In some implementations, a content management system 120 can retrieve location and/or identification information associated with one or more client devices (e.g., CPE devices 110a-c or peripheral devices 115a-c) via a CDN 105. For example, when requesting multimedia content from the content management system 120, a client device can transmit a message to the content management system comprising information identifying the multimedia content requested and information identifying the physical location of the client device. In various implementations, the content management system 120 can determine the physical location of a client device using information contained in a message received from the client device, data received directly from the client device (e.g. GPS or other positioning systems) or from a secondary device connected to the client device (e.g., a set top box/DVR, a CM, a wireless router, an EMTA, a gateway device, etc.), and/or data received from sources external to the client device.

In some implementations, the content management system 120 can transmit information identifying the physical location of a client device to a rules engine 125 and the rules engine can retrieve multimedia content associated with the physical location of the client device from a content server (e.g., location-based content server 130).

In some implementations, the location-based content server 130 can store multimedia content along with relationships between the multimedia content and geographic or physical locations. For example, relationships between multimedia content and locations can include a measurement of the relevance of content to a location (e.g., a weighting factor). In various implementations, a location-based content server can organize multimedia content based on the relationship between the content and a geographical location or proximity. As an example, when a rules engine receives a request for content and information identifying the location of a client device from a content management system, the rules engine can identify the location-based content stored on the location-based content server that has the strongest relationship to the location of the client device and can transmit the identified content to the content management system.

The strength of a relationship, in some implementations, can be a function providing a combination of access to the advertiser and relevance of the advertisement. For example, the access to the advertiser can be given increased weight as a device moves closer to an advertiser. In some examples, the weight may decrease after the user is within a specified distance of the advertiser, which can factor in the probability that the user is already aware of the advertiser or is even present at the advertiser location. Conversely, an advertiser may want to increase their advertisement's weight if the user is close to or within a competitor's location. Additionally, there may be physical barriers included in the evaluation for a given location. For example, although a user may be close to a vendor, there may be an intervening barrier (e.g., security checkpoints at an airport or stadium, or natural features in parks such as the Grand Canyon) that prevents access to some premises.

In some implementations, the content management system can retrieve user-requested multimedia content from a content server (e.g., content server 135). In various implementations, after the content management system retrieves user-requested multimedia content and location-based content associated with a request received from a client device, the content management system can aggregate the user-requested content and location-based content and can transmit the aggregated content to the client device via the CDN 105. It should be understood that in segmented hypertext transmission protocol (SHT) transmissions, the aggregation can be in the form of one or more manifest files instructing the client device where to retrieve the requested content and the location-based content.

Figure 2:
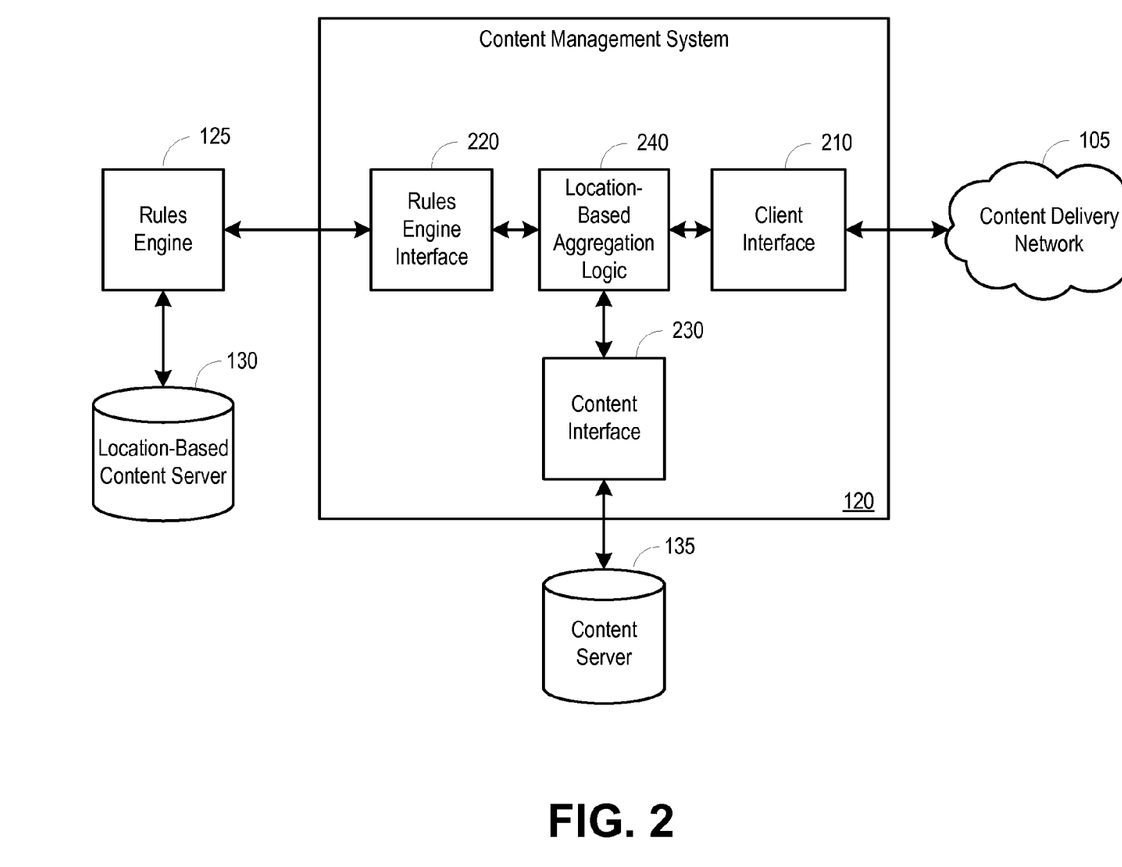
FIG. 2 is a block diagram illustrating an example content management system operable to aggregate requested multimedia content and location-based content.

FIG. 2 is a block diagram illustrating an example content management system 120 operable to aggregate requested multimedia content and location-based content. The content management system 120 can include a client interface 210, a rules engine interface 220, a content interface 230, and location-based aggregation logic 240.

In some implementations, a client interface 210 can be used to communicate with one or more client devices (e.g., CPE devices 110*a-c* or peripheral devices 115*a-c*) via a CDN 105. For example, the client interface 210 can be used to receive messages from one or more client devices requesting multimedia content for viewing. Further, the client interface can be used to send multimedia content (e.g., aggregated user-requested content and location-based content) to one or more client devices.

In some implementations, a rules engine interface 220 can be used to communicate with a rules engine 125. For example, the rules engine interface 220 can be used to send data identifying the location of a client device to a rules engine 125. In various implementations, a rules engine interface can identify a rules engine to communicate with based on the type of device from which a request for content is received. For example, each of the various types of client devices (e.g., STB, computer, mobile device, tablet, etc.) can receive different forms of content, thus, a unique rules engine can be established for each of the various types of devices. In some implementations, the rules engine interface 220 can be used to receive content that is related to the physical location of a client device requesting multimedia content. For example, a rules engine can identify multimedia content stored on a server (e.g., location-based content server 130) that is related to the physical location of the client device requesting content and the rules engine can retrieve the identified multimedia content from the content server and transmit the content to the content management system. In other implementations, the location-based content can be stored in a combined server facility with the other multimedia content (e.g., content server 135 of FIG. 1). In still other implementations, the rules engine can communicate the locations or uniform resource locators (URL) of the location-based content to location-based aggregation logic 240. It should be understood that in some implementations, the rules engine can be integrated with the content management system 120.

In some implementations, a content interface 230 can be used to send requests to and receive content from a content server 135. For example, the content interface 230 can send a request to a content server for the multimedia content requested for viewing by a client device. Further, the content interface can be used to receive the requested multimedia content from a content server.

In some implementations, location-based aggregation logic 240 can determine the immediate and/or anticipated physical location of a client device. In various implementations, location-based aggregation logic can determine the immediate and/or anticipated physical location of a client device based on location information included in a message sent from the client device to the content management system 120. In other implementations, location-based aggregation logic can determine the immediate and/or anticipated physical location of a client device based on data or information received from the client device or from one or more devices attached to the client device (e.g., global positioning system (GPS), motion detectors, gyroscopes, etc.). In still other implementations, location-based aggregation logic can determine the immediate and/or anticipated physical location of a client device based on data or information received from sources external to the client device including, cell-phone towers that are accessed by the client device, a network associated with the client device (e.g., traceroute data), user-reported locations, services that can anticipate the position of the client device at a specific point in time (e.g., TripIt), as well as other sources.

In some implementations, location-based aggregation logic 240 can aggregate user-requested multimedia content and location-based content. In various implementations, retrieved location-based content can include advertisements that are relevant to the physical location of the client device requesting multimedia content, and the advertisements can be aggregated into the user-requested multimedia content. In other implementations, the user-requested multimedia content can be a request for multimedia content that is relevant to the physical location of the user requesting the multimedia content, and the location-based aggregation logic can aggregate location-based content that is relevant to the physical location of the client device from which the request is sent.

Figure 3:
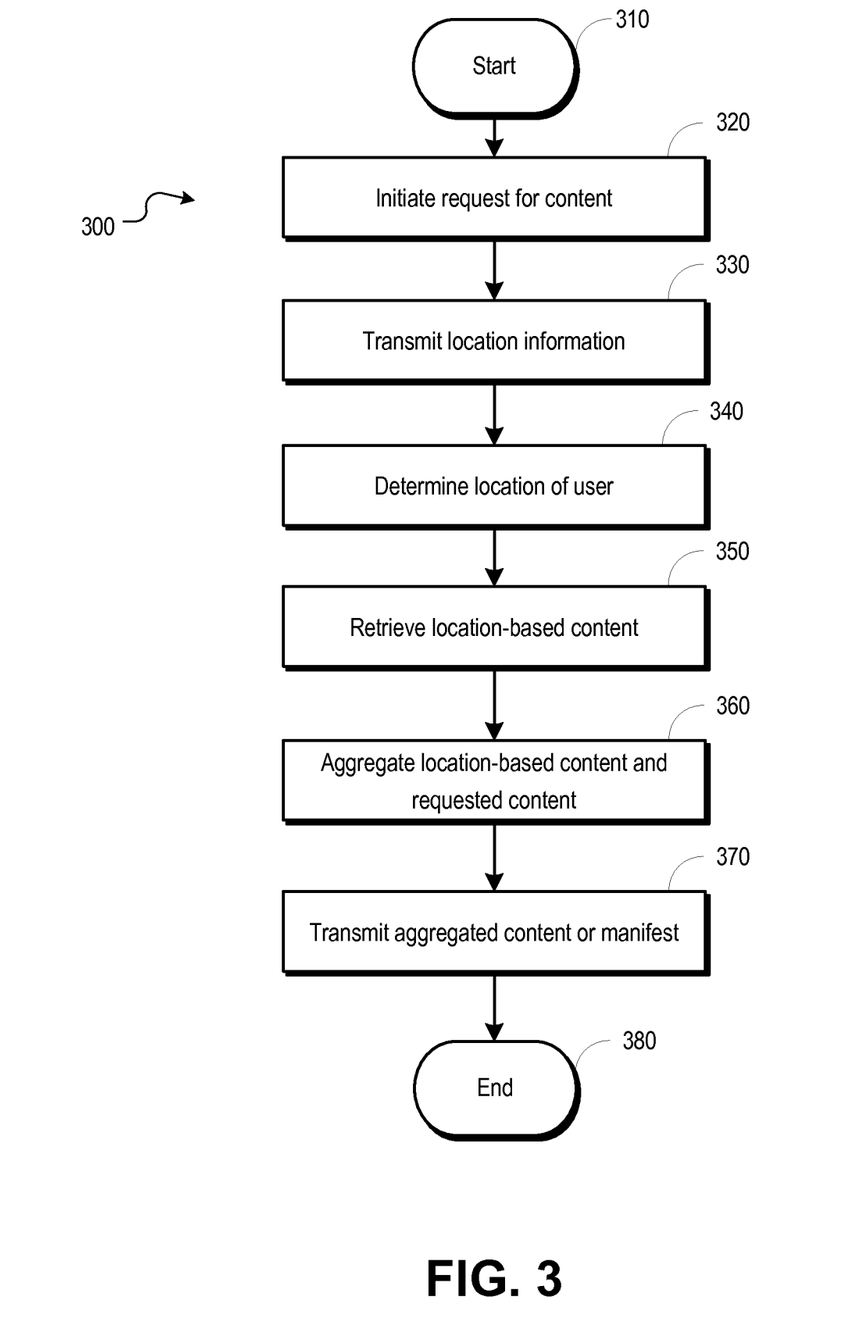
FIG. 3 is a flowchart illustrating an example process operable to aggregate requested multimedia content and location-based content.

FIG. 3 is a flowchart illustrating an example process 300 operable to aggregate requested multimedia content and location-based content. The process 300 can start at stage 310 when a user locates content to request. For example, a user can locate content through an interactive program guide, a built-in VoD client, a browser, or other mechanisms.

After a user locates content, the process 300 can proceed to stage 320. At stage 320, a user can initiate a request for the located content. A user can initiate a request for content, for example, by selecting content from an interactive program guide, a built-in VoD client, a browser, as well as other means for accessing available content. In some implementations, the content requested can be a certain program. In other implementations, the request can be a general request for content related to the user's current location.

After a user initiates a request for the located content, the process 300 can proceed to stage 330. At stage 330, information identifying the location of a client device from which the request was initiated can be transmitted. The information identifying the location of a client device can be transmitted, for example, by the client device (e.g., CPE devices 110a-c or peripheral devices 115a-c) or other devices (e.g., devices attached to the client device, access points or devices utilized by the client device, etc.) and can be received by a content management system 120 via a client interface 230 of FIG. 2. In some implementations, the client device from which a request is initiated can request content by transmitting a message to a content management system, and the message can contain information identifying the location of the client device. In various implementations, location information transmitted from a client device can include explicit location information, network transport information indicating the origin of a message, and/or other types of information that can be used by a content management system to determine the location of a client device requesting content. For example, location information can include an express specification of a device location and/or information from which a device location can be inferred. In some implementations, location information transmitted by a client device can include identification information that can be coupled with information or data received from one or more sources external to the client device to predict the physical location of the client device. For example, location information transmitted by a client device can be coupled with data or information received from various sources including, a GPS attached to the client device, deduced reckoning equipment (e.g., motion detectors, gyroscopes, etc.) attached to the client device, one or more cellphone towers used by the client device, a network associated with the client device identifying one or more routers accessed by the client device (e.g., traceroute data), user-reported locations, services that can anticipate the position of the client device at a specific point in time (e.g., TripIt), as well as other sources. It should be understood that in some implementations, location information associated with the client device can be inferred from data received with the request, thereby obviating the transmission of location information.

After information identifying the location of a client device is transmitted, the process 300 can proceed to stage 340. At stage 340, the immediate and/or anticipated physical location of the client device can be determined. The physical location of the client device can be determined, for example, by logic located in the content management system 120 (e.g., location-based aggregation logic 240). In some implementations, the physical location of the client device can be determined based on information or data received directly from the client device. For example, the location information received from the client device can include a description of the location of the client device (e.g., coordinates, relative location of device, etc.). In other implementations, the physical location of the client device can be determined based on data or information received from sources external to the client device (e.g., cellphone towers, itinerary services, network devices accessed by the client device, scanning of a quick response (QR) code or universal product code (UPC) attached to a fixed location, etc.).

After the physical location of a client device has been determined, the process 300 can proceed to stage 350. At stage 350, location-based content can be retrieved. Location-based content can be retrieved, for example, by an engine operable to identify multimedia content that is relevant to the physical location of a client device (e.g., rules engine 125). In some implementations, location-based content can be identified from a server in which multimedia content is stored and organized based on the content's relationship to a physical or geographic location (e.g., location-based content server 130). For example, multimedia content stored in a location-based content server can be associated with a geographic location (e.g., region, state, county, city, etc.), a relative physical location (e.g., restaurants in airports, souvenir shops in parks, tourist attractions in parks, galleries in museums, etc.), or any other proximity or location-based description.

After location-based content has been retrieved, the process 300 can proceed to stage 360. At stage 360, the retrieved location-based content can be aggregated with user-requested multimedia content. Location-based content can be aggregated with user-requested multimedia content, for example, by logic located in a content management system 120 (e.g., location-based aggregation logic 240). In some implementations, location-based aggregation logic can aggregate location-based advertisements and multimedia content requested by a user. For example, location-based aggregation logic can retrieve user-requested multimedia content from a content server (e.g., content server 135), identify one or more positions in the multimedia content at which to insert one or more advertisements, and insert one or more content-based advertisements at the identified positions in the multimedia content. In various implementations, location-based aggregation logic can respond to a user's request for location-relevant multimedia content by retrieving location-based content from a location-based content server 130 or by aggregating a plurality of location-based content retrieved from a location-based content server. In other implementations, a combined manifest file may be assembled containing URLs for the identified user-requested content and location-based advertising content, if any.

After location-based content and requested multimedia content have been aggregated, the process 300 can proceed to stage 370. At stage 370, aggregated multimedia content can be transmitted. Aggregated multimedia content can be transmitted, for example, by a content management system via a client interface 210 of FIG. 2 to the client device requesting the multimedia content. After aggregated multimedia content is transmitted, the process 300 can proceed to stage 380 where the process 300 ends. If a protocol using manifest files is being used by the user device, the content management system can transmit the combined manifest file to the device for the device to utilize in retrieving the content directly.

Figure 4:
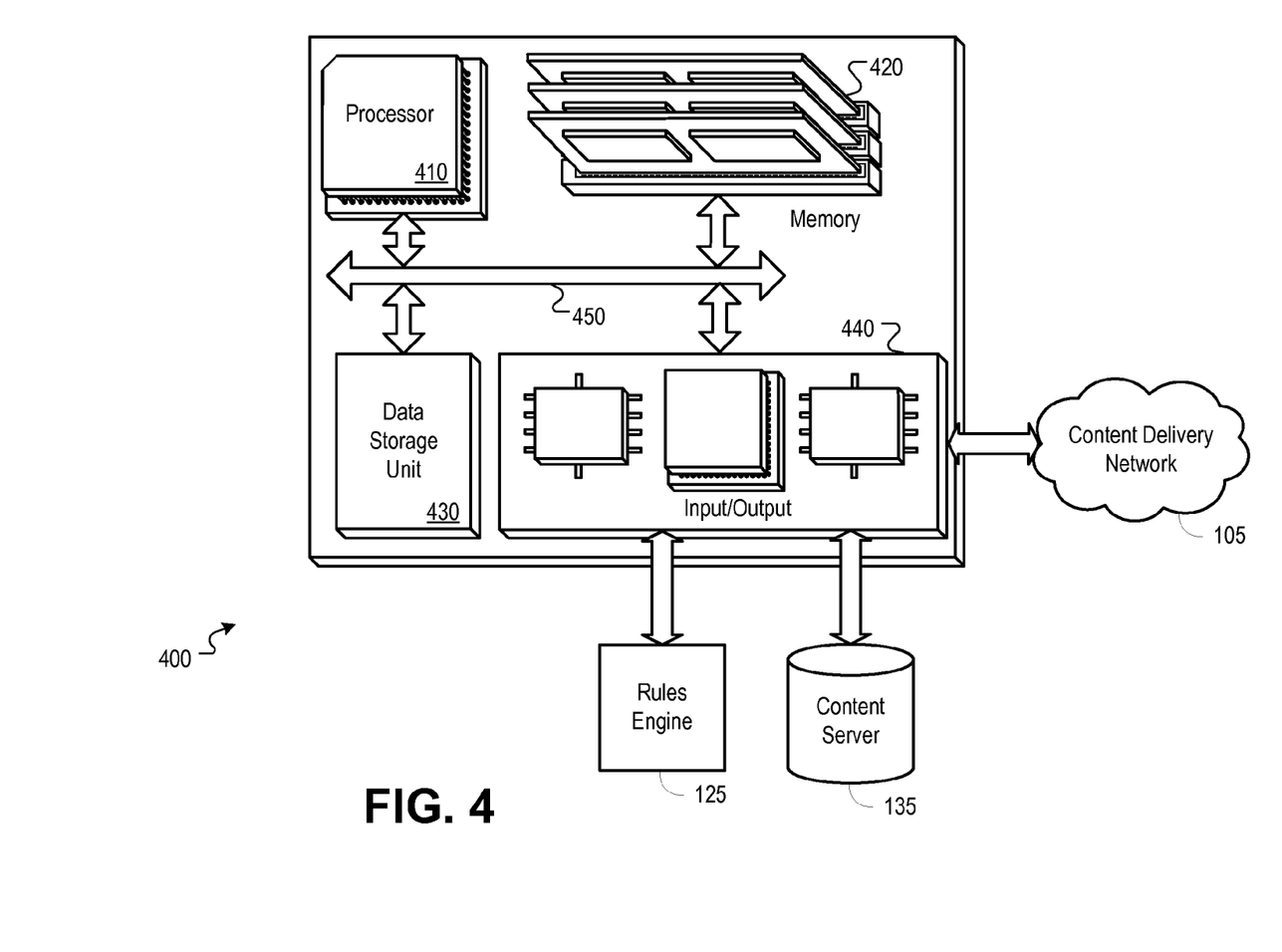
FIG. 4 is a block diagram of a hardware configuration operable to aggregate requested multimedia content and location-based content.

FIG. 4 is a block diagram of a hardware configuration 400 operable to aggregate requested multimedia content and location-based content or build a combined manifest file. The hardware configuration 400 can include a processor 410, memory 420, a data storage unit 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the data storage unit 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit. In various implementations, the memory can be used to store identification and/or location information associated with one or more client devices.

In some implementations, the storage unit 430 can be capable of providing mass storage for the hardware configuration 400. In one implementation, the storage unit 430 can be a computer-readable medium. In various other implementations, the storage unit 430 can, for example, include a hard disk device, an optical disk device, flash memory or some other large capacity storage device. In other implementations, the storage unit 430 can be a device external to the hardware configuration 400. In various implementations, the storage unit can be capable of storing identification and/or location information associated with one or more client devices.

The input/output device 440 can provide input/output operations for the hardware configuration 400. In some implementations, the input/output device 440 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). For example, the input/output device can include an interface device operable to communicate with a content delivery network 105 (e.g., HFC network). In various implementations, the input/output device can include driver devices configured to receive input data and send output data to a data store and/or a storage device external to the hardware configuration 400. In some implementations, the input/output device can be used to receive identification and/or location information associated with a client device via a CDN 105. In various implementations, the input/output device can be used to send aggregated multimedia content to one or more client devices.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal (e.g., a machine generated electrical, optical, or electromagnetic signal) that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display (e.g., a CRT (cathode ray tube) or LCD (liquid crystal display) monitor) for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising:
    determining a physical location of a device requesting at least a first piece of multimedia content based on location information associated with the device requesting multimedia, wherein the location information comprises an identification of the proximity of the device to a location within a constrained space;
    retrieving at least a second piece of multimedia content associated with the physical location of the device requesting multimedia content, wherein the second piece of multimedia content is selected based upon an association between the second piece of multimedia content and the identified proximity of the device to the location within the constrained space;
    aggregating the multimedia content associated with the physical location of the device and multimedia content requested by the device; and
    providing the aggregated multimedia content to the device requesting the multimedia content.

2. The computer-implemented method of claim 1, wherein the physical location of the device comprises an anticipated physical location.

3. The computer-implemented method of claim 1, wherein the physical location of the device comprises a geographic location or a location relative to a premise.

4. The computer-implemented method of claim 1, wherein the physical location of the device is determined from data or information retrieved from the device or from a device attached or connected to the device.

5. The computer-implemented method of claim 4, wherein the device connected to the device comprises a global positioning system or deduced reckoning equipment.

6. The computer-implemented method of claim 1, wherein the physical location of the device is determined from data or information retrieved from a source that is external to the device requesting the multimedia content.

7. The computer-implemented method of claim 6, wherein the data or information retrieved from a source external to the device requesting multimedia content comprises timestamp and location data generated by one or more cell-phone towers accessed by the device, traceroute data generated by a network supporting the device, geographic or relative location information provided by a user of the device, location and timing information stored by itinerary services, or location or proximity data or information stored by any other source.

8. The computer-implemented method of claim 1, wherein the providing of aggregated multimedia content comprises transmitting the aggregated content.

9. The computer-implemented method of claim 1, wherein the providing of aggregated multimedia content comprises transmitting a manifest or equivalent directing the device to retrieve the aggregated content.

10. A system, comprising:
    an interface operable to receive information identifying a physical location of a device requesting multimedia content and to respond to the device, wherein the information comprises an identification of the proximity of the device to a location within a constrained space;
    a data store operable to store computer program instructions; and
    a processor operable to execute said computer program instructions, the computer program instructions being operable to cause the processor to:
    select at least one piece of multimedia content based upon at least the physical location of the device, wherein the at least one piece of multimedia content is selected based upon an association between the piece of multimedia content and the identified proximity of the device to the location within the constrained space; and aggregate the multimedia content selected based upon at least the physical location of the device with the multimedia content requested by the device.

11. The system of claim 10, wherein the physical location of the device comprises an anticipated physical location.

12. The system of claim 10, wherein the physical location of the device comprises a geographic location or a location relative to a premise.

13. The system of claim 10, wherein the computer program instructions are further operable to cause the processor to:
determine the physical location of the device based on data or information retrieved from the device requesting multimedia content or from a device attached or connected to the device requesting multimedia content.

14. The system of claim 13, wherein the device connected to the device requesting multimedia content comprises a global positioning system or deduced reckoning equipment.

15. The system of claim 10, wherein the computer program instructions are further operable to cause the processor to:
determine the physical location of the device based on data or information comprising timestamp and location data generated by one or more cell-phone towers accessed by the device, traceroute data generated by a network supporting the device, geographic or relative location information provided by a user of the device, location and timing information stored by itinerary services, or location or proximity data or information stored by any other source that is external to the device requesting the multimedia content.

16. One or more non-transitory computer readable media operable to execute on one or more processors, the computer readable media being operable to cause the one or more processors to perform the operations comprising:
determining a physical location of a device requesting multimedia content based on location information associated with the device requesting multimedia, wherein the location information comprises an identification of the proximity of the device to a location within a constrained space;
retrieving at least one piece of multimedia content associated with the physical location of the device requesting multimedia content, wherein the at least one piece of multimedia content is selected based upon an association between the piece of multimedia content and the identified proximity of the device to the location within the constrained space; and
aggregating the multimedia content associated with the physical location of the device and multimedia content requested by the device.

17. The one or more non-transitory computer-readable media of claim 16, wherein the physical location of the device comprises an immediate physical location, an anticipated physical location, a geographic location, or a location relative to a premise.

18. The one or more non-transitory computer-readable media of claim 16, wherein the physical location of the device is determined from data or information retrieved from the device or from a device attached or connected to the device requesting multimedia content.

19. The one or more non-transitory computer-readable media of claim 18, wherein the device connected to the device requesting multimedia content comprises a global positioning system or deduced reckoning equipment.

20. The one or more non-transitory computer-readable media of claim 16, wherein the physical location of the device requesting multimedia content is determined from data or information comprising timestamp and location data generated by one or more cell-phone towers accessed by the device, traceroute data generated by a network supporting the device, geographic or relative location information provided by a user of the device, location and timing information stored by itinerary services, or location or proximity data or information stored by any other source external to the device requesting multimedia content.

* * * * *